(12) United States Patent
Dürner et al.

(10) Patent No.: US 12,480,534 B2
(45) Date of Patent: Nov. 25, 2025

(54) VALVE AND AIRCRAFT

(71) Applicant: Liebherr-Aerospace Lindenberg GmbH, Lindenberg (DE)

(72) Inventors: Andreas Dürner, Lindenberg i.A. (DE); Thomas Sauterleute, Wangen (DE); Anton Gaile, Leutkirch (DE)

(73) Assignee: LIEBHERR-AEROSPACE LINDENBERG GMBH, Lindenberg (DE)

( * ) Notice: Subject to any disclaimer, the term of this patent is extended or adjusted under 35 U.S.C. 154(b) by 189 days.

(21) Appl. No.: 18/358,744

(22) Filed: Jul. 25, 2023

(65) Prior Publication Data
US 2024/0035493 A1    Feb. 1, 2024

(30) Foreign Application Priority Data

Jul. 27, 2022  (DE) .................... 10 2022 118 889.2

(51) Int. Cl.
| F15B 13/04 | (2006.01) |
| F16K 11/07 | (2006.01) |
| F16K 27/04 | (2006.01) |

(52) U.S. Cl.
CPC ...... *F15B 13/0402* (2013.01); *F16K 11/0716* (2013.01); *F16K 27/041* (2013.01); *F16K 27/048* (2013.01)

(58) Field of Classification Search
CPC ................ F15B 13/0402; F15B 13/086; F15B 13/0442; F15B 2211/3144; F15B 2211/3122; F16K 11/0716; F16K 27/041
See application file for complete search history.

(56) References Cited

U.S. PATENT DOCUMENTS

| 3,695,121 | A | * | 10/1972 | Corrigan | F16H 59/08 475/132 |
| 3,972,264 | A | * | 8/1976 | Field, Jr. | F15B 13/0402 91/358 A |
| 3,972,267 | A | * | 8/1976 | Haak | F15B 13/01 91/461 |
| 4,041,983 | A | * | 8/1977 | Bianchetta | F15B 13/0402 91/461 |
| 2004/0079425 | A1 | * | 4/2004 | Rub | F15B 13/0418 137/625.65 |
| 2004/0236472 | A1 | * | 11/2004 | Junk | F15B 19/005 700/282 |
| 2005/0260064 | A1 | * | 11/2005 | Imai | F15B 13/0402 415/24 |
| 2013/0056657 | A1 | * | 3/2013 | Burkhart | F15B 13/0402 251/25 |
| 2019/0085870 | A1 | * | 3/2019 | Wang | F15B 13/0402 |
| 2019/0316606 | A1 | * | 10/2019 | Fox | F15B 11/17 |

FOREIGN PATENT DOCUMENTS

| DE | 102006040234 A1 | 3/2008 |
| EP | 1526289 A2 | 4/2005 |
| EP | 1593893 A1 | 11/2005 |
| EP | 3553325 A1 | 10/2019 |
| FR | 3066999 A1 | 12/2018 |

* cited by examiner

*Primary Examiner* — Kelsey E Cary
(74) *Attorney, Agent, or Firm* — McCoy Russell LLP

(57) ABSTRACT

The present disclosure relates to a valve, preferably a continuous valve or a proportional valve, wherein the valve comprises means configured to control and/or regulate a pressure and/or flow of a fluid, wherein the means are further configured to effect at least one further function or to participate in the function.

16 Claims, 3 Drawing Sheets

VALVE AND AIRCRAFT

CROSS REFERENCE TO RELATED APPLICATION

The present application claims priority to German Patent Application No. 10 2022 118 889.2 filed on Jul. 27, 2022. The entire contents of the above-listed application are hereby incorporated by reference for all purposes.

TECHNICAL FIELD

The present disclosure relates to a valve, preferably a continuous valve or proportional valve, wherein the valve comprises means configured to control and/or regulate a pressure and/or flow of a fluid.

BACKGROUND

For example, to control hydraulic motors in aircrafts, such as on a flap/slat drive unit, control blocks with valves or hydraulic valves are used in the prior art.

Such a valve, referred to for example as a Main Control Valve (MCV), controls or regulates the flow of hydraulic fluid in a valve block for, for example, a hydraulic motor. FIG. 5A shows schematic circuit diagram of such a valve block B with an MCV arranged thereon and therein for a hydraulic motor M connected to the valve block B from the prior art. The valve block B comprises lines which are supplied with hydraulic fluid by the inlet SU. Through the outlet RE, the hydraulic fluid is discharged from the valve block B again, for example to close a larger hydraulic circuit. Likewise, the valve block comprises, for example, a hydraulic port POB for further consumers. The MCV comprises a spool SL, the movement of which can be used to control the supply of hydraulic fluid or hydraulic pressure to lines in the switching block B. The spool SL is centered by a spring assembly SP. The switching block B comprises three solenoid valves or switching valves, Extend E, Retract R and Brake B, wherein by means of the solenoid valves E and R the spool SL of the MCV can be pressed into the corresponding position by applying the corresponding lines with a supply pressure. The spool SL then unblocks openings in a spool sleeve for the corresponding lines. By means of the spring assembly SP and a clocked switching of the solenoids Extend E and Retract R, the spool SL can be held in intermediate positions, i.e. floating, whereby certain openings in the spool sleeve can be defined, i.e. partially opened, for example, and defined flow rates can be achieved. The position of the spool SL can be determined by a differential transformer LVDT.

To achieve a defined start-up of the motor M, it is held in place by a hydraulically actuated brake. Only when the spool SL is moved, there is sufficient pressure available at the solenoid valve Brake B to release the brake. The spring assembly translates the pressure applied to the spool into displacement information, which can be read out by means of the LVDT and used for monitoring purposes. In this way, pressure information can be generated indirectly. In addition, the correct behavior of the MCV can be monitored via the LVDT.

This implementation requires multiple solenoid valves, a large number of chokes and a complex spring assembly. The chokes in particular are relatively expensive as purchased parts. Each solenoid valve requires a relatively high switching current. The implementation of the hydraulic lines results in a relatively large and thus heavy valve block, with correspondingly high pressure losses in the lines. A very large spool stroke is required. This increases the size of the MCV. An LVDT is also required.

SUMMARY

Against this background, the object underlying the present disclosure is to provide an improved valve, in particular a smaller, lighter, less expensive and simpler valve, in particular with less energy demand and higher hydraulic performance, i.e. with less pressure loss.

Said object is achieved by the method and structure described herein. Accordingly, it is provided in accordance with the disclosure that the means are further configured to effect at least one further function or to participate in enabling the function.

Instead of the MCV, a type of electrohydraulic servo valve (EHSV) is preferably used. An EHSV can preferably implement control commands with very small currents and thus unblock the flow to the motor.

The second function is, for example, the provision of pressure to open a brake and is preferably only available once the spool has been deflected by a certain distance.

Thus, control of the flow for a hydraulic consumer, e.g. a hydraulic motor or cylinder, can be achieved with simultaneous hydraulic locking when not actuated.

Preferably it is provided that the means comprise a spool and a spool sleeve.

In other words, a valve, such as a continuous valve, proportional valve or a valve with another control characteristic with at least one additional function, which is not for primary pressure and/or flow control, integrated on the same spool sleeve is preferably proposed.

In an advantageous embodiment, it is provided that the function is to provide fluid at the required pressure and/or flow for a component, such as for example an actuating valve for a brake or for a mode valve of a primary flight control system or a brake or interlocking means.

This function can thus preferably be used as a control for e.g. a brake in a high-lift system or of a mode valve in the primary flight control. Other functions are also conceivable, such as braking or locking functions, which are always required when no control command is given.

Conceivably, a sensor is provided that can determine the pressure and/or flow rate for the component.

The pressure signal from the switching port can preferably be used not only for hydraulic unlocking, but also for monitoring purposes. This allows the LVDT to be replaced with a pressure sensor, for example.

It can be provided that the function is effected when there is no actuation of the valve.

It is conceivable that the function is effected with the characteristic of a switching or continuous function.

It can be provided that the valve is controlled via a mechanical inlet.

Preferably, the valve does not comprise any switching valves and/or springs.

It is conceivable that the spool has a spool stroke of 0.5 mm to 3 mm, preferably 1 mm to 2 mm.

In an advantageous embodiment, it is provided that the valve is an electrohydraulic servo valve (EHSV) and can preferably be actuated with an actuating current of +/−10 mA.

The valve can also be a directly controlled valve.

Preferably, it is provided that the valve is arranged on and/or in a valve block for a hydraulic consumer, preferably a motor or a cylinder.

The disclosure also relates to an aircraft comprising a valve according to the disclosure.

It is also conceivable that the valve comprises a spool and a spool sleeve, wherein the spool comprises a control surface and the spool sleeve comprises an opening, wherein the valve is configured such that the control surface can cover the opening, wherein the spool can be positioned such that the control surface at least partially does not cover the opening, wherein the spool sleeve comprises a further opening, wherein the control surface can cover the further opening, wherein the spool can be positioned such that the control surface at least partially does not cover the opening and the further opening, respectively.

It is also conceivable that the control surface can completely cover the openings. Likewise, more than two openings can be provided, which can be covered or not covered by the control surface.

The valve is preferably used to control the flow for a hydraulic consumer, e.g. a hydraulic motor, in a high-lift system. In this case, the consumer requires for example, at least 2 discrete volume flows.

The control surface may also be referred to as the control edge. The control surface is preferably a surface uninterrupted by steps, edges or the like, which glides on or in the inner surface of the control sleeve.

The control surface preferably covers the opening in such a way that no fluid or only a negligible amount of fluid can pass through the opening.

Preferably, it is provided for the valve to have a flow characteristic line having at least one discrete step.

It is conceivable that the openings were made by laser cutting.

In an advantageous embodiment, it is provided that the openings are spaced from each other, wherein the openings have a spacing of 0.1 mm to 1 mm, preferably a spacing of 0.1 mm to 0.6 mm or of 0.2 mm to 0.4 mm.

It may be provided that the openings have a circular, rectangular, trapezoidal, oval, triangular or teardrop shape, the shape preferably having rounded corners.

It is to be noted here that the terms "one" and "a" do not necessarily refer to exactly one of the elements, although this is a possible version, but can also denote a plural of the elements. Likewise, the use of the plural form also includes the presence of the element in question in singular form and, vice versa, the singular also includes several of the elements in question. Further, all of the features of the disclosure described herein may be claimed in any combination or in individually.

BRIEF DESCRIPTION OF THE DRAWINGS

Further advantages, features and effects of the present disclosure will be apparent from the following description of preferred exemplary embodiments with reference to the Figures, in which the same or similar components are indicated by the same reference characters. Shown are in.

DETAILED DESCRIPTION

An exemplary continuous valve includes a spool assembly comprising a spool and a spool sleeve. The continuous valve is, for example, an electrohydraulic servo valve (EHSV). The spool is designed to be capable to deliver hydraulic flow to a consumer, such as a motor, in proportion to the spool stroke.

In addition, the spool valve is designed in such a way that when the spool valve is moved from its neutral position, additional hydraulic pressure is supplied to a single solenoid valve. When this is actuated, pressure is available, for example, to open a brake of a high-lift system.

By means of a pressure sensor, e.g. at the switching output, it can be checked whether a deflection of the spool has taken place during actuation. In addition, direct information about the supply pressure is available when the valve is actuated.

Thus, all hydraulic functions and safety levels are implemented, which are included in the solution according to the prior art.

Figure 1:
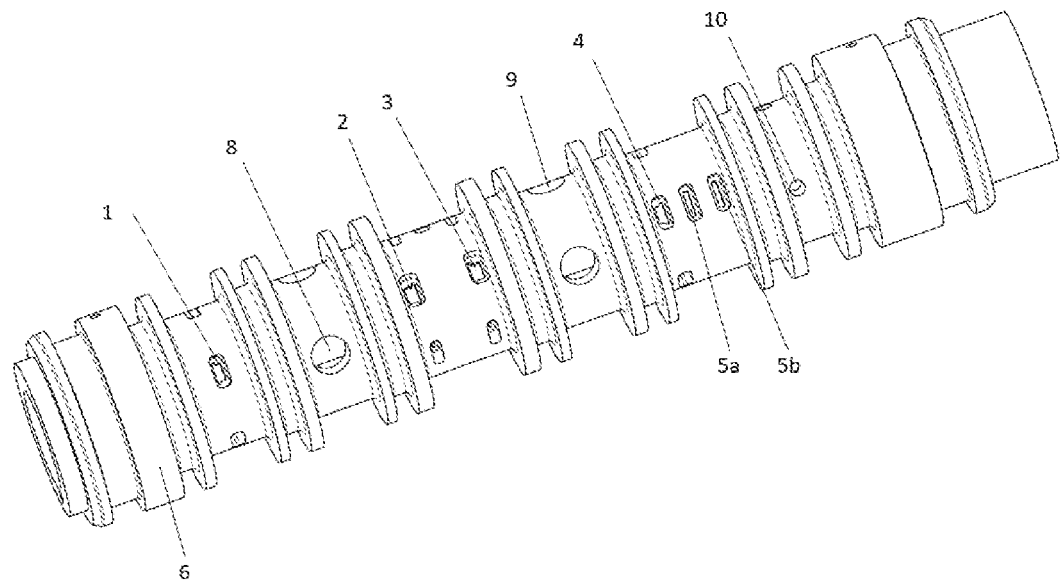
FIG. 1: A view of an embodiment of a spool of a valve according to the disclosure.

FIG. 1 shows the spool sleeve 6 of the continuous valve. Hydraulic fluid is supplied through the control slots 1 and 4. The openings 8 and 9 allow the hydraulic fluid to flow to and from the consumer, e.g. a hydraulic motor. The expanded working fluid flows back through slots 2 and 3 into the return line of the system.

Figure 2:
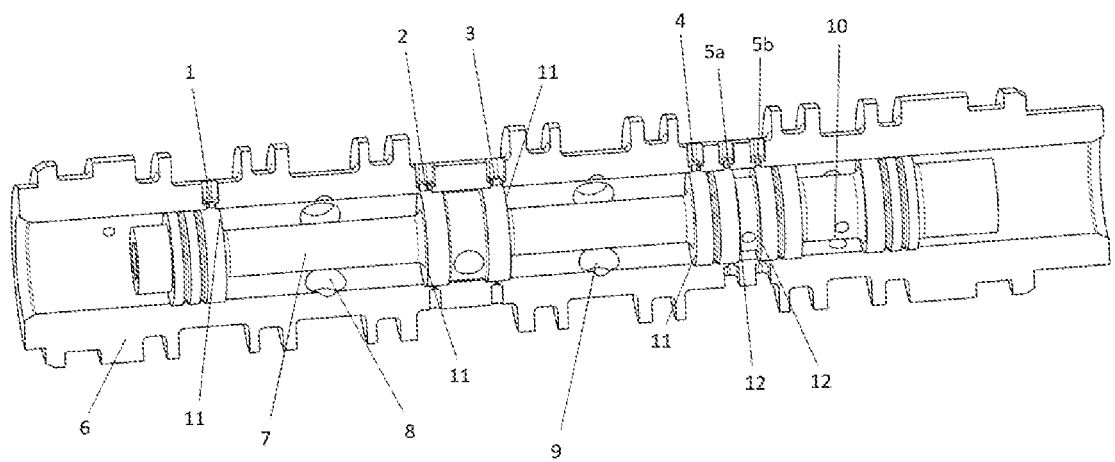
FIG. 2: A sectional view of an embodiment of a spool of a valve according to the disclosure.

FIG. 2 shows the spool group in partial section. Depending on the direction of movement of the spool 7 relative to the spool sleeve 6, the individual control openings are connected to each other. If the spool 7 in FIG. 2 moves to the right, the supply pressure applied to opening 4 is connected to outlet 9, which directs the fluid to the consumer. The fluid thus flows to the consumer and from this via opening 8 back into the sleeve. The fluid flows into the return flow of the system via the opening 2, which is now also open. With the shape of the control openings 1, 2, 3 and 4, it is possible to achieve, for example, a linear relationship between the spool stroke and the flow to the consumer. In this example, this would be the characteristic of a proportional valve.

If the spool 7 is moved by a sufficiently large amount out of the neutral position, then, depending on the direction of movement, further control edges 5*a* and 5*b* are opened in addition to the above-mentioned control edges for the consumer. If the spool moves to the right, for example, opening 5*b* is unblocked. Through this, a pressure or flow signal is routed to the opening 10, where it is available for a further function. In this example, two functions are implemented at outlet 10. On the one hand, the pressure is monitored by means of a pressure sensor. This indirectly signals whether the spool is in neutral position or not. On the other hand, if pressure is applied, a brake in the high-lift system, which is held closed by means of springs, can be opened hydraulically.

By selecting different overlaps of the control edges for the primary consumer 11 at the control openings for these 1, 2, 3 and 4 in relation to the control edges for the additional function 12 at the control openings for these 5a, 5b, a certain switching behavior can be set. For example, the main consumer can only be supplied with operating liquid when the additional function has been triggered or vice versa.

In the present case, the overlaps are selected in such a way that a pressure can be measured at outlet 10 or the brake can be opened before the consumer, e.g. a hydraulic motor, is supplied with the operating medium.

Figure 3:
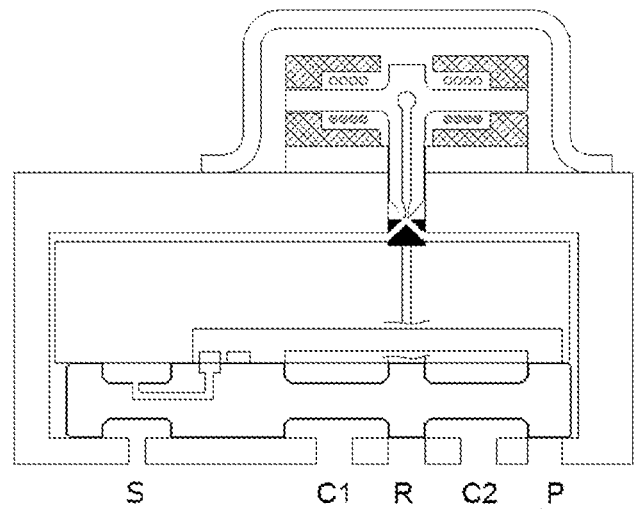
FIG. 3: A schematic circuit diagram of an embodiment of a valve block with a valve according to the disclosure.
Figure 4:
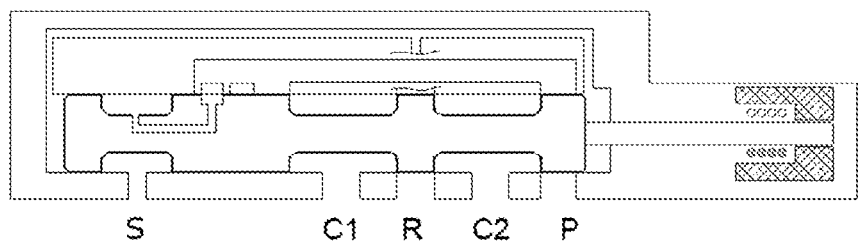
FIG. 4: A schematic circuit diagram of a further embodiment of a valve block with a valve according to the disclosure.
Figure 5:
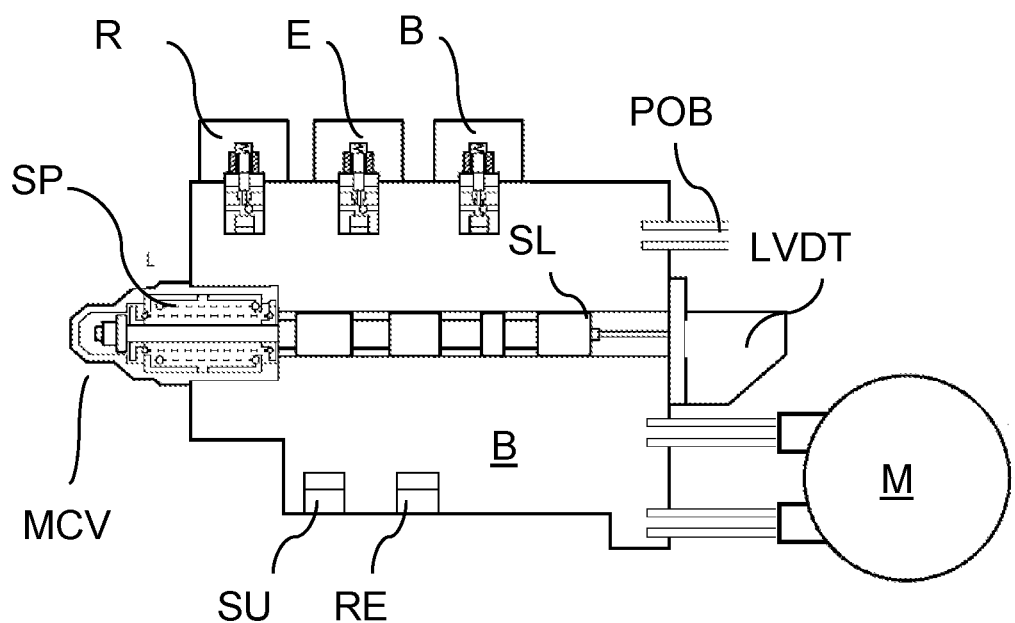
FIG. 5: A schematic circuit diagram of an embodiment of a prior art switching block with a valve and a motor.

FIG. 3 and FIG. 4 show details of schematic views of valves with the ports S, C1, R, C2, and P, where P denotes the supply inlet, R denotes the outlet, C1 and C2 denote the pressure and/or flow control ports, and S denotes the port for another function.

The disclosure has the following advantages:

The integrated switching function eliminates the need for multiple solenoid valves.

The use of EHSV technology eliminates the need for a complex spring assembly or the clocked switching of solenoid valves.

The current demand is significantly reduced. For example, only +/−10 mA instead of several amperes per solenoid valve are required to switch the valve.

The pressure signal at the switching function, for example, instead of an LVT, the LVDT can be used as a monitoring means for the spool position.

Due to the high dynamics of the EHSV, arbitrary control dynamics can be implemented by means of appropriate actuation.

When a pressure sensor is integrated, the pressure can be measured much more accurately.

Because of the EHSV function, speed control is possible even with a fixed displacement motor.

The elimination of switching valves and throttles makes the valve block much more compact and saves the cost of these purchased parts.

FIGS. 1-2 are drawn to scale, although other relative dimensions may be used.

The invention claimed is:

1. A valve, the valve comprising a spool within a spool sleeve,
   wherein the spool is configured to move axially relative to the spool sleeve between a neutral position and an extreme position,
   wherein, when the spool moves in a first direction from the neutral position to a first position between the neutral position and the extreme position, a first control opening in the spool sleeve is fluidically coupled to a first outlet in the spool sleeve while a second control opening in the spool sleeve is blocked,
   wherein, when the spool moves further in the first direction from the first position towards the extreme position, the second control opening is fluidically coupled to a second outlet in the spool sleeve, the second outlet in the spool sleeve fluidically coupled to a consumer, and
   wherein the first outlet communicates hydraulic pressure from the first control opening to a pressure sensor, directs the hydraulic pressure to open a brake in a high lift system, and/or directs the hydraulic pressure to a mode valve of a primary flight control system when the first outlet is fluidically coupled to the first control opening.

2. The valve according to claim 1, wherein the brake is engaged when there is no actuation of the valve, and wherein actuation of the valve opens the brake.

3. The valve according to claim 1, wherein fluidically coupling the first control opening to the first outlet causes a switching or proportional function.

4. The valve according to claim 1, wherein the valve is controlled via a mechanical input.

5. The valve according to claim 1, wherein the valve does not comprise switching valves and/or springs.

6. The valve according to claim 1, wherein the spool has a spool stroke of from 0.3 mm to 3 mm.

7. The valve according to claim 1, wherein the valve is an electrohydraulic servo valve (EHSV) and can be actuated with an actuating current of +/−10 mA.

8. The valve according to claim 1, wherein the valve is arranged on and/or in a valve block for a hydraulic consumer, including a motor or a cylinder.

9. An aircraft comprising a valve according to claim 1.

10. The valve according to claim 1, wherein the first control opening is spaced apart from the second control opening by a distance of 0.1 mm to 1 mm, and wherein the spool stroke is 0.5 mm to 3 mm.

11. A method of operating a continuous or proportional valve, comprising:
    controlling and/or regulating a pressure and/or flow of a fluid, wherein controlling and/or regulating the pressure and/or the flow of the fluid comprises actuating a spool within a spool sleeve of the valve; and
    effecting at least one further operation or to participate in enabling the operation, wherein the operation comprises releasing a brake;
    wherein the spool sleeve comprises a plurality of control openings and a plurality of outlets;
    wherein a first outlet of the plurality of outlets is configured to direct operating fluid to the brake and a second outlet of the plurality of outlets is configured to direct the operating fluid to a consumer;
    wherein the valve is configured such that actuating the spool within the spool sleeve a first distance in a first direction from a neutral position comprises fluidly connecting a first control opening of the plurality of control openings and the first outlet while a second control opening of the plurality of control openings remains fluidly isolated from the second outlet, wherein fluidly connecting the first control opening and the first outlet releases the brake;
    wherein the valve is further configured such that actuating the spool within the spool sleeve a second distance in the first direction from the neutral position comprises fluidly connecting the second control opening and the second outlet; an wherein the first distance is less than the second distance.

12. The method according to claim 11, wherein a sensor is provided which can determine the pressure and/or flow rate for the component.

13. The method according to claim 11, wherein the brake is engaged when the valve is in the neutral position.

14. The method according to claim 13, wherein the operation is effected with the characteristic of a switching or proportional operation.

15. The method according to claim 14, wherein the valve is controlled via a mechanical input.

16. The method according to claim 15, wherein the valve does not comprise switching valves and/or springs.

* * * * *